(12) United States Patent
Yin et al.

(10) Patent No.: US 9,602,840 B2
(45) Date of Patent: Mar. 21, 2017

(54) METHOD AND APPARATUS FOR ADAPTIVE GROUP OF PICTURES (GOP) STRUCTURE SELECTION

(75) Inventors: Peng Yin, West Windsor, NJ (US); Jill MacDonald Boyce, Manalapan, NJ (US); Alexandros Tourapis, Burbank, CA (US)

(73) Assignee: THOMSON LICENSING, Boulogne-Billancourt (FR)

( * ) Notice: Subject to any disclaimer, the term of this patent is extended or adjusted under 35 U.S.C. 154(b) by 2631 days.

(21) Appl. No.: 12/087,637

(22) PCT Filed: Jan. 7, 2007

(86) PCT No.: PCT/US2007/002387
§ 371 (c)(1),
(2), (4) Date: Jul. 8, 2008

(87) PCT Pub. No.: WO2007/092193
PCT Pub. Date: Aug. 16, 2007

(65) Prior Publication Data
US 2009/0122860 A1    May 14, 2009

Related U.S. Application Data

(60) Provisional application No. 60/765,552, filed on Feb. 6, 2006.

(51) Int. Cl.
*H04N 7/12* (2006.01)
*H04N 19/87* (2014.01)
(Continued)

(52) U.S. Cl.
CPC .......... *H04N 19/87* (2014.11); *H04N 19/114* (2014.11); *H04N 19/137* (2014.11); *H04N 19/14* (2014.11);
(Continued)

(58) Field of Classification Search
CPC .... H04N 19/114; H04N 19/137; H04N 19/14; H04N 19/142; H04N 19/177; H04N 19/61; H04N 19/87
(Continued)

(56) References Cited

U.S. PATENT DOCUMENTS 5,592,226 A * 1/1997 Lee ...................... H04N 19/503
                                                            348/700
5,751,358 A * 5/1998 Suzuki ................. H04N 19/176
                                                            375/240.04
(Continued)

FOREIGN PATENT DOCUMENTS

EP    0881836        12/1998
EP    0881836 B1    11/2004
(Continued)

OTHER PUBLICATIONS

Ozbek, N.; Tekalp, A.M.; , "Fast H.264/AVC video encoding with multiple frame references," Image Processing, 2005. ICIP 2005. IEEE International Conference on , vol. 1, No., pp. I-597-600, Sep. 11-14, 2005.*
(Continued)

*Primary Examiner* — Jessica M Prince
(74) *Attorney, Agent, or Firm* — Tutunjian & Bitetto, P.C.

(57) ABSTRACT

There are provided a method and apparatus for adaptive Group of Pictures structure selection. The apparatus includes an encoder for encoding a video sequence using a Group of Pictures structure by performing, for each Group of Pictures for the video sequence, picture coding order selection, picture type selection, and reference picture selection. The selections are based upon a Group of Pictures length.

14 Claims, 3 Drawing Sheets

(51) Int. Cl.
*H04N 19/61* (2014.01)
*H04N 19/114* (2014.01)
*H04N 19/14* (2014.01)
*H04N 19/137* (2014.01)
*H04N 19/142* (2014.01)
*H04N 19/177* (2014.01)

(52) U.S. Cl.
CPC ......... *H04N 19/142* (2014.11); *H04N 19/177* (2014.11); *H04N 19/61* (2014.11)

(58) Field of Classification Search
USPC ................ 375/240.01–240.29; 382/173, 236
IPC ........................... H04N 7/12; G06K 9/34,9/46
See application file for complete search history.

(56) References Cited

U.S. PATENT DOCUMENTS

| | | | |
|---|---|---|---|
| 6,229,925 | B1 | 5/2001 | Alexandre et al. |
| 6,307,886 | B1 * | 10/2001 | Westermann ............ 375/240.09 |
| 6,606,409 | B2 * | 8/2003 | Warnick et al. ............. 382/173 |
| 6,771,825 | B1 * | 8/2004 | Hurst, Jr. ............. H04N 19/114 375/E7.151 |
| 6,959,044 | B1 * | 10/2005 | Jin ....................... H04N 19/172 348/699 |
| 2002/0028023 | A1 | 3/2002 | Kazayama et al. |
| 2004/0146108 | A1 | 7/2004 | Hsia |
| 2005/0117640 | A1 | 6/2005 | Han |
| 2005/0117647 | A1 | 6/2005 | Han |

FOREIGN PATENT DOCUMENTS

| | | |
|---|---|---|
| EP | 1538566 | 6/2005 |
| EP | 1538567 | 6/2005 |
| JP | 2002010270 | 1/2002 |
| JP | 2002199398 | 7/2002 |
| JP | 2003032691 | 1/2003 |
| WO | WO2005055606 | 6/2005 |
| WO | WO2005055608 | 6/2005 |

OTHER PUBLICATIONS

Yoneyama, A. et al., "MPEG Encoding Algorithm with Scene Adaptive Dynamic GOP Structure," IEEE Signal Processing Society 1999 Workshop on Multimedia Signal Processing, Sep. 13-15, 1999, Copenhagen, Denmark, pp. 297-302.

Bjontegaard, G., et al., "Overview of the H. 264/AVC video coding standard," IEEE Transactions on Circuits and Systems for Video Technology, IEEE Service Center, Piscataway, NJ, vol. 13, No. 7, Jul. 2003, pp. 560-576, XP011099249.

Dumitras, A. et al., "I/P/B frame type decision by collinearity of displacements," Image Processing, ICIP 2004, 2004 International Conference in Singapore Oct. 24-27, 2004, Piscataway, NJ, IEEE, pp. 2769-2772, XP010786362.

Lee, J. et al., "Rate-Distortion Optimized Frame Type Selection for MPEG Encoding," IEEE Transactions on Circuits and Systems for Video Technology, vol. 7, No. 3, Jun. 1997, pp. 501-510.

Lee, J. et al., "Temporally Adaptive Motion Interpolation Exploiting Temporal Masking in Visual Perception," IEEE Transaction on Circuits and Systems for Video Technology, vol. 3, No. 5, Sep. 1994, pp. 513-526.

Ozbek, N., et al., "Fast H. 264/AVC Video Encoding with Multiple Frame References," Image Processing, 2005, ICIP 2005, IEEE International Conference in Genova, Italy, Sep. 11-14, 2005, Piscataway, NJ, pp. 597-600, XP010850820.

Wiegand, T. et al., "Overview of the H.264/AVC Video Coding Standard," IEEE Transaction on Circuits and Systems for Video Technology, vo. 13, No. 7, Jul. 2003, pp. 560-576.

Search Report Dated Aug. 3, 2007.

* cited by examiner

METHOD AND APPARATUS FOR ADAPTIVE GROUP OF PICTURES (GOP) STRUCTURE SELECTION

CROSS-REFERENCE TO RELATED APPLICATIONS

This application claims the benefit, under 35 U.S.C. §365 of International Application PCT/US2007/002387, filed Jan. 30, 2007 which was published in accordance with PCT Article 21(2) on Aug. 16, 2007 in English and which claims the benefit of United States provisional patent application No. 60/765,552 filed Feb. 6, 2006, which is incorporated by reference herein in its entirety.

TECHNICAL FIELD

The present principles relate generally to video encoding and, more particularly, to a method and apparatus for adaptive Group of Pictures (GOP) structure selection.

BACKGROUND

In general, in older and current video coding standards and recommendations, a Group of Pictures (GOP) structure only involves GOP length (N) and picture type (i.e., P-picture interval M) selection. Such older video coding standards and recommendations include, for example, the International Organization for Standardization/International Electrotechnical Commission (ISO/IEC) Moving Picture Experts Group-1 (MPEG-1) standard, the ISO/IEC MPEG-2 standard, the International Telecommunication Union, Telecommunication Sector (ITU-T) H.263 recommendation. A new video compression standard/recommendation, the ISO/IEC MPEG-4 Part 10 Advanced Video Coding (AVC) standard/ITU-T H.264 recommendation (hereinafter the "MPEG-4 AVC standard"), provides several new tools to improve coding efficiency.

Similar to older video coding standards and recommendations, the MPEG-4 AVC standard uses/supports three different picture (slice) types (I, P and B pictures (slices)). Moreover, the MPEG-4 AVC standard includes new tools/features to improve coding efficiency.

For example, the MPEG-4 AVC standard decouples the order of reference pictures from the display order. In prior video coding standards and recommendations, there was a strict dependency between the ordering of pictures from motion compensation purposes and the ordering of pictures for display purposes. In the MPEG-4 AVC standard, these restrictions are largely removed, allowing the encoder to choose the reference order and display order with more flexibility.

Moreover, the MPEG-4 AVC standard decouples picture representation methods from picture referencing capability. In prior video coding standards and recommendations, B pictures cannot be used as references for the prediction of other pictures in the video sequence. In the MPEG-4 AVC standard, there is no such constraint. Any picture type can be used as a reference picture or a non-reference picture.

Further, the MPEG-4 AVC standard allows multiple reference pictures for motion compensation. With these new features, when a GOP structure is selected, we need to consider not only the GOP length and the picture type selection, but also the coding order of the picture and the reference picture selection.

Most previous work related to the GOP structure has been concentrated on GOP length and picture type selection. The GOP length is, in general, fixed by the application. When dynamic GOP length is allowed, the first picture after the scene change is coded as an I-picture, and the next GOP is merged to the current GOP.

In a first prior art approach, a method is disclosed in which the GOP structure is adapted by taking into account temporal segmentation. That is, picture types are adjusted according to the temporal variation of the input video.

In a second prior art approach, it is disclosed that the optimal picture type in the GOP may be selected from possible candidates by solving a minimization problem with the Lagrange multiplier method.

In a third prior art approach, a system is disclosed wherein macroblock activity information is used to decide picture type.

As noted above, most of the prior art related to the GOP structure has only concentrated on GOP length and picture type selection. However, the consideration of only GOP length and picture type selection disadvantageously limits the flexibility of the MPEG-4 AVC standard.

SUMMARY

These and other drawbacks and disadvantages of the prior art are addressed by the present principles, which are directed to a method and apparatus for adaptive Group of Pictures (GOP) structure selection.

According to an aspect of the present principles, there is provided an apparatus. The apparatus includes an encoder for encoding a video sequence using a Group of Pictures structure by performing, for each Group of Pictures for the video sequence, picture coding order selection, picture type selection, and reference picture selection. The selections are based upon a Group of Pictures length.

According to another aspect of the present principles, there is provided a video encoding method. The method includes encoding a video sequence using a Group of Pictures structure by performing, for each Group of Pictures for the video sequence, picture coding order selection, picture type selection, and reference picture selection. The selections are based upon a Group of Pictures length.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
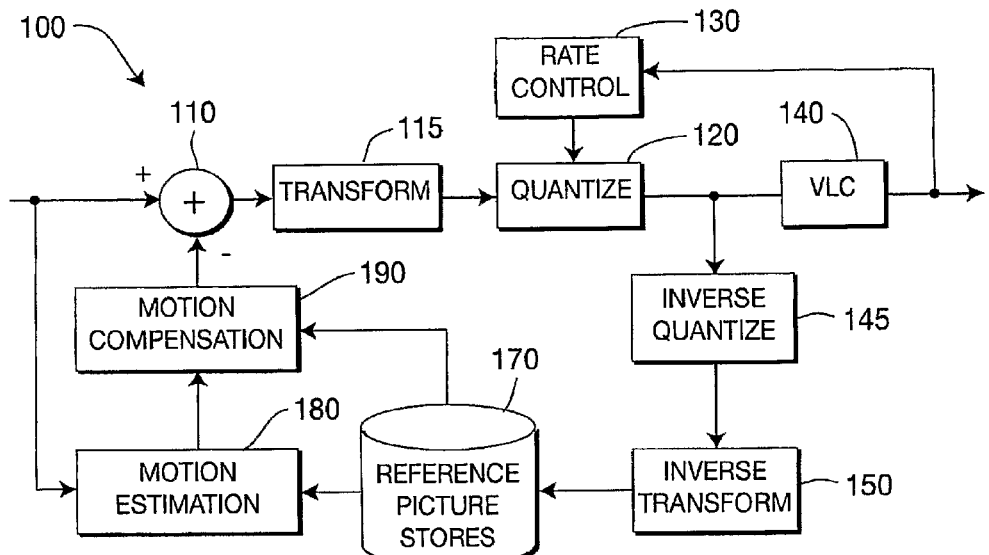
FIG. 1 shows a block diagram for an exemplary video encoder to which the present principles may be applied, in accordance with an embodiment of the present principles.

The present principles are directed to a method and apparatus for adaptive Group of Pictures (GOP) structure selection.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Turning to FIG. 1, an exemplary video encoder to which the present principles may be applied is indicated generally by the reference numeral 100.

A non-inverting input of a summing junction 110 and a first input of a motion estimator 180 are available as inputs to the video encoder 100. An output of the summing junction 110 is connected in signal communication with an input of a transformer 115. An output of the transformer 115 is connected in signal communication with an input of a quantizer 120. An output of the quantizer 120 is connected in signal communication with an input of a variable length coder (VLC) 140. An output of the VLC 140 is available as an output of the encoder 100. A rate control block 130 has an input connected in signal communication with the output of the variable length coder 140. An output of the rate control block 130 is connected to another input of the quantizer 120.

The output of the quantizer 120 is further connected in signal communication with an input of an inverse quantizer 150. An output of the inverse quantizer 150 is connected in signal communication with an input of an inverse transformer. An output of the inverse transformer is connected in signal communication with an input of a reference picture store 170. A first output of the reference picture store 170 is connected in signal communication with a second input of a motion estimator 180. An output of the motion estimator 180 is connected in signal communication with a first input of a motion compensator 190. A second output of the reference picture store 170 is connected in signal communication with a second input of the motion compensator 190. An output of the motion compensator 190 is connected in signal communication with an inverting input of the summing junction 110.

Advantageously, a method and apparatus are provided for Group of Pictures (GOP) structure selection. In an embodiment, the method and apparatus for GOP structure selection may encompass within the decision process an analysis of GOP length, coding order of picture, picture type selection and picture reference decision. That is, the method and apparatus may jointly consider GOP length, picture coding order, picture type selection and reference picture selection for the GOP structure selection.

Although described in terms of a MPEG-4 AVC standard encoding scheme with adaptive GOP structure, which jointly considers GOP length, picture coding order, picture type selection and reference picture decision, it is to be appreciated that the present invention is not limited to the preceding considerations and is also not limited to the MPEG-4 AVC standard. That is, given the teachings of the present principles provided herein, one of ordinary skill in this and related arts will contemplate these and various other considerations and video coding standards/recommendations to which the present principles may be applied, while maintaining the scope of the present principles.

In an embodiment, a shot detection is first performed. Then the GOP length is decided based on the temporal segmentation. Within each GOP, the picture coding order combined with the picture type and reference picture selection is then decided.

Figure 2:
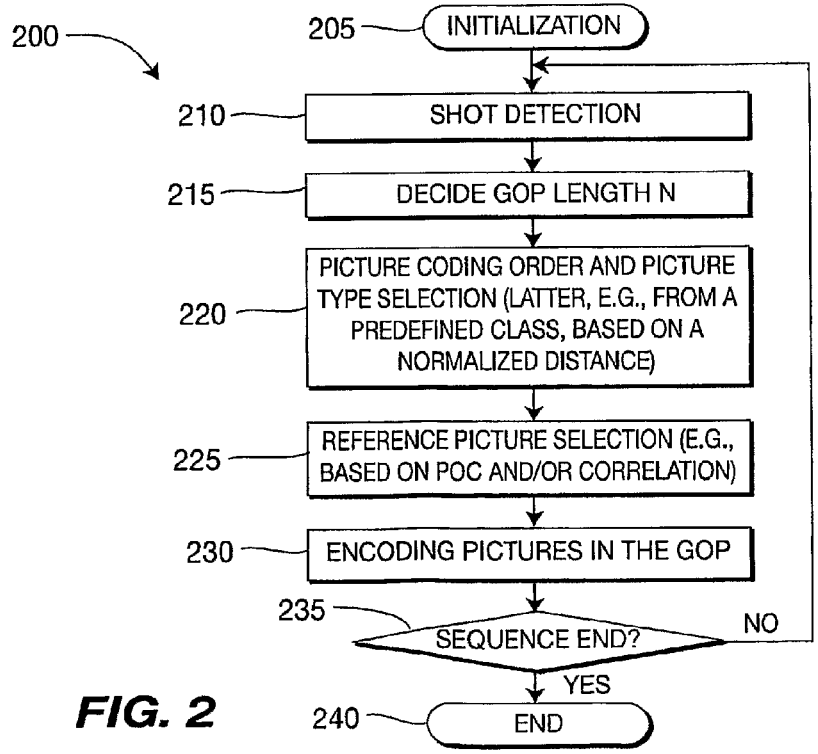
FIG. 2 shows a flow diagram for an exemplary method for an adaptive Group of Picture (GOP) structure decision, in accordance with an embodiment of the present principles.

Turning to FIG. 2, an exemplary method for an adaptive Group of Picture (GOP) structure decision is indicated generally by the reference numeral 200.

The method 200 includes an initialization block 205 that passes control to a function block 210. The function block 210 performs a shot detection, and passes control to a function block 215. The function block 215 decides the GOP length N, and passes control to a function block 220. The function block 220 determines the picture coding order, performs a picture type selection, and passes control to a function block 225. The function block 225 performs reference picture selection (e.g., based on Picture Order Count (POC) and/or correlation), and passes control to a function block 230. The function block 230 encodes the pictures in the GOP, and passes control to a decision block 235. The decision block 235 determines whether or no the sequence is ended. If so, then control is passed to an end block 240. Otherwise, control is returned to the function block 210.

The selection of GOP length, for example, as performed by function block 215 of the method 200 of FIG. 2, will now be further described in accordance with an embodiment of the present principles.

The GOP length is selected dynamically based on shot detection. Unlike prior methods, where only scene cut is detected, we also detect slow transitions, such as fade and dissolve. The GOP length N is generally fixed by a pre-defined value. If a scene cut is detected, then a new GOP restarts from the first picture after the scene cut with length N. If a slow transition is detected, then a new GOP restarts from the starting point of transition and ends at the ending point of transition.

Figure 3:
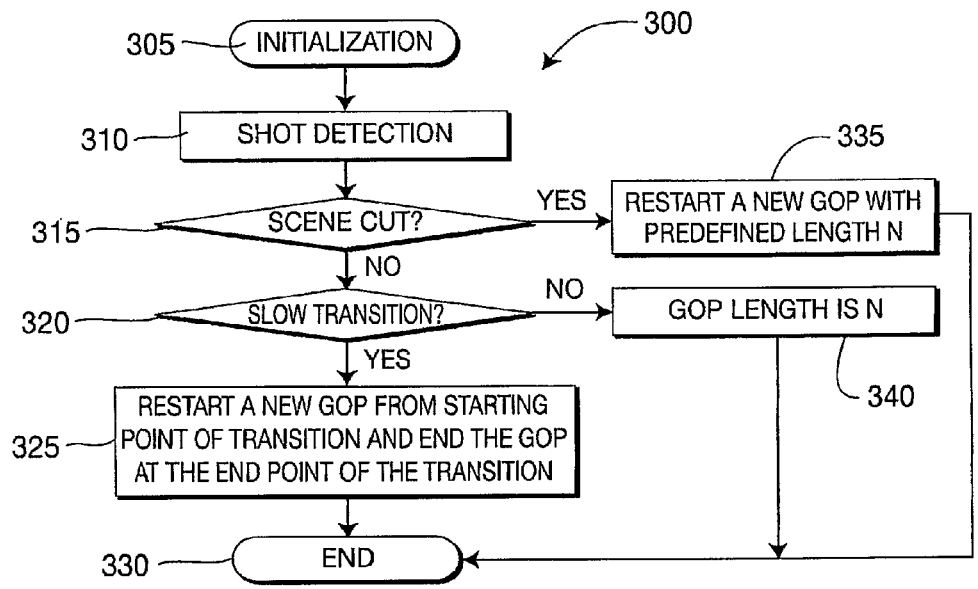
FIG. 3 shows a flow diagram for an exemplary method for performing a Group of Pictures (GOP) length decision, in accordance with an embodiment of the present principles.

Turning to FIG. 3, an exemplary method for performing a Group of Pictures (GOP) length decision is indicated generally by the reference numeral 300. The method 300 relates to the function block 215 of the method 200 of FIG. 2.

The method 300 includes an initialization block 305 that passes control to a function block 310. The function block 310 performs a shot detection, and passes control to a function block 315. The function block 315 determines whether or not a scene cut has been detected. If so, then control is passed to a function block 335. Otherwise, control is passed to a decision block 320.

The function block 335 restarts a new GOP with a pre-defined length N, and passes control to an end block 330.

The decision block 320 determines whether or not a slow transition has been detected. If so, then control is passed to a function block 325. Otherwise, control is passed to a function block 340.

The function block 325 restarts a new GOP from the starting point of transition and ends at the end point of the transition, and passes control to the end block 330.

The function block 340 sets the GOP length to N, and passes control to the end block 330.

The determination of picture coding order, for example, as performed by function block 220 of the method 200 of FIG. 2, will now be further described in accordance with an embodiment of the present principles.

The picture coding order in each GOP is decided based on the characteristics of the content. For some specific feature, like cross-fades, a reverse coding of the fade-in sequence has higher coding efficiency. The detection of the switching point, from which reverse coding can happen, is considered in two cases.

In the first case, if the sequence is pure fade-in, then the switching point is set to the minimum of the maximal picture number that can be reversed while satisfying the delay constraint, a Decoded Picture Buffer (DPB) size, and the end picture of the fade-in sequence. Since we code the fade-in as a single GOP, we can reversely code the picture at the beginning of the GOP and at end of the GOP.

In the second case, if the sequence is dissolve, then the detection of the switching point is based on simple absolute differences of pictures. Of course, it is to be appreciated that other distortion metrics may also be used to detect the switching point, while maintaining the scope of the present principles. Distortion of the current pictures from the start and from the end pictures are computed as follows:

distortion/start=$\Sigma |Y_{Fcur}[x,y]-Y_{Fstart}[x,y]|$ distortion/end=$\Sigma |Y_{Fcur}[x,y]-Y_{Fend}[x,y]|$ where Y denotes the luminance value of the picture, x specifies the column indices of the image, y specifies the row indices of the image, $Y_{Fcur}$ denotes the luminance value of the current frame, $Y_{Fstart}$ denotes the luminance value of the start frame, and $Y_{Fend}$ denotes the luminance value of the end frame. A switching point is flagged as soon as distortion/start>distortion/end.

Reverse coding is limited by application delay constraints and in the most open case, to Decoder Picture Buffer constraints specified in the MPEG-4 AVC standard.

Figure 4:
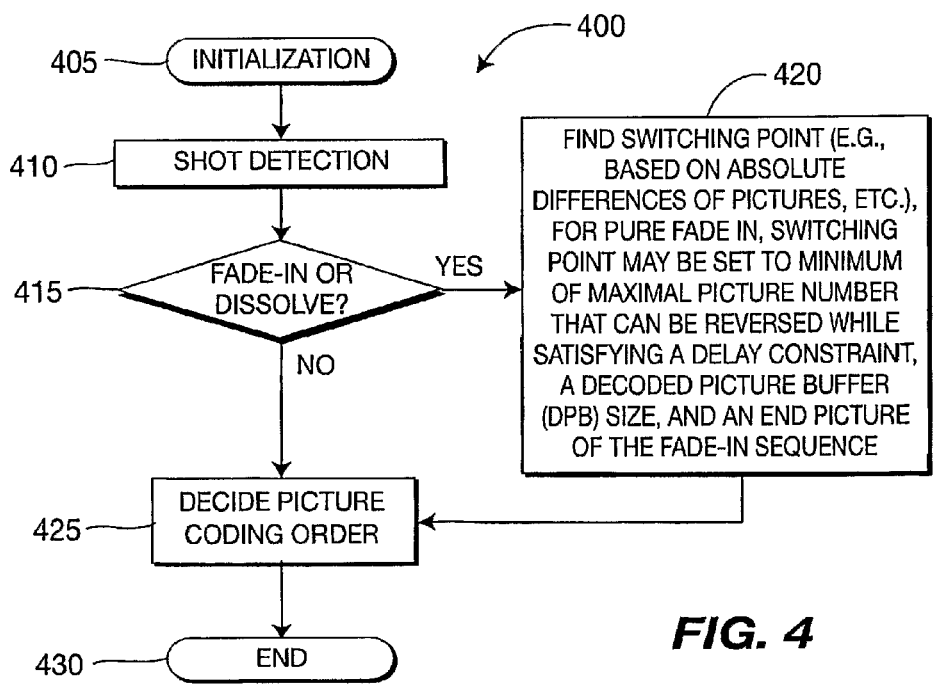
FIG. 4 shows a flow diagram for an exemplary method for determining picture coding order, in accordance with an embodiment of the present principles.

Turning to FIG. 4, an exemplary method for determining picture coding order is indicated generally by the reference numeral 400. The method 400 relates to the function block 220 of the method 260 of FIG. 2.

The method 400 includes an initialization block 405 that passes control to a function block 410. The function block 410 performs a shot detection, and passes control to a decision block 415. The decision block 415 determines whether or not a fade-in or dissolve has been detected. If so, then control is passed to a function block 420. Otherwise, control is passed to a function block 425.

The function block 420 finds the switching point, and passes control to a function block 425.

The function block 425 decides the picture coding order, and passes control to an end block 430.

The performing of picture type selection, for example, as performed by function block 220 of FIG. 2, will now be further described in accordance with an embodiment of the present principles.

We select picture type from, for example, M=1, 2, 3, 4, as shown in Table 1 with deterministic coding order. It is to be appreciated that the present principles may also be applied to other picture types including, but not limited to, hierarchical B structures, while maintaining the scope of the present principles. Table 1 illustrates picture type and coding order, where "BS" denotes a stored B picture and "B" denotes a disposable B picture. The normalized distance between two consecutive P pictures in a GOP is used to decide M. M is selected as the value which has the smallest distance. Many distance metrics can be used, such as absolute difference of image, difference of histogram, histogram of difference, block histogram of difference, block variance difference, motion compensation error, and so forth. That is, the present principles are not limited to the use of any particular distance metric and, thus, any distance metric as readily contemplated by one of ordinary skill in this and related arts may be used in accordance with the teachings of the present principles, while maintaining the scope of the present principles. In an embodiment, we use histogram of difference, i.e., the histogram of $Y_n-Y_m$, is denoted by hod(i) where $i \in [-q+1,-q-1]$. The distance measure is defined as follows:

$$D(Y_n, Y_m) = \frac{\sum\limits_{i \notin [-a,a]} hod(i)}{\sum\limits_{i=-q+1}^{i=q-1} hod(i)},$$

where a is a threshold for determining the closeness of the position to zero.

TABLE 1

| | |
|---|---|
| M = 1 | I0 P1 P2 P3 P4 P5 P6 P7 P8 P9 P10 P11 I12 |
| M = 2 | I0 P2 B1 P4 B3 P6 B5 P8 B7 P10 B9 I12 B11 |
| M = 3 | I0 P3 B1 B2 P6 B4 B5 P9 B7 B8 I12 B10 B11 |
| M = 4 | I0 P4 BS2 B1 B3 P8 BS6 B5 B7 I12 BS10 B9 B11 |

Figure 5:
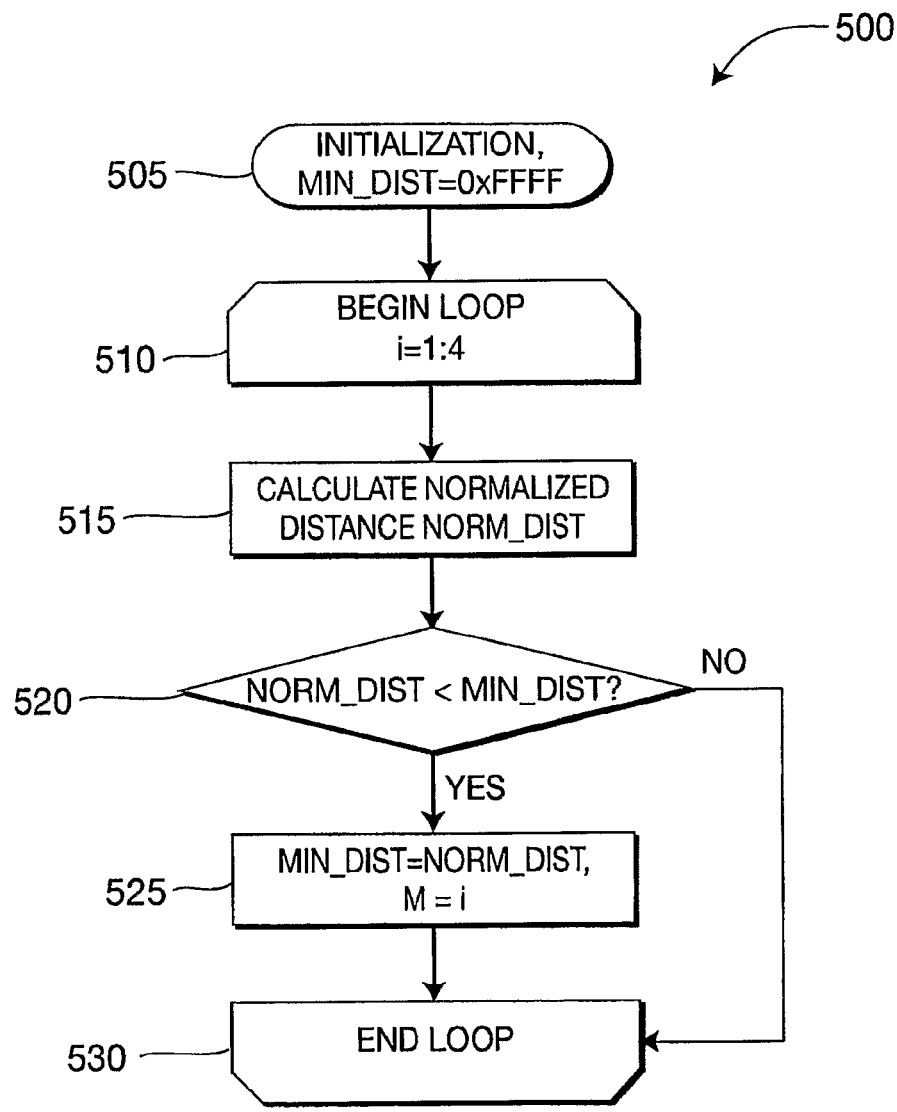
FIG. 5 shows a flow diagram for an exemplary method for selecting picture type, in accordance with an embodiment of the present principles.

Turning to FIG. 5, an exemplary method for selecting picture type is indicated generally by the reference numeral 500. The method 500 relates to the function block 220 of the method 200 of FIG. 2.

The method 500 includes an initialization block 505 that initializes a variable min_dist to be equal to 0xFFFF, and passes control to a loop limit block 510. The loop limit block 510 begins a loop (i=1:4) that loops over each of the different values of M in a Group of Pictures (GOP), and passes control to a function block 515. The function block 515 calculates the normalized distance norm_dist, and passes control to a decision block 520. The decision block 520 determines whether or not norm_dist<min_dist. If so, then control is passed to a function block 525. Otherwise, control is passed to a loop limit block 530 that ends the loop.

The performing of reference picture selection, for example, as performed by function block 225 of FIG. 2, will now be further described in accordance with an embodiment of the present principles.

Reference picture selection may be performed in two steps. The first step involves deciding if the current encoded picture will be stored as a possible reference picture and which previously stored picture will be removed from the reference buffer. The second step involves selecting the L reference pictures (L is a pre-defined value by the encoder) from the reference list and deciding the order of the reference pictures, which will be used for each P/B picture encoding.

For illustrative purposes, two exemplary algorithms are provided herein. The first algorithm is based on the picture order count (POC) and is hereinafter referred to as the "POC algorithm". The second algorithm is based on a correlation metric and hereinafter referred to as the "CORRELATION algorithm".

In the POC algorithm, the removal of reference pictures is based on the order of POC: the picture with smallest POC number is removed first. For reference picture selection, the reference list is first reordered and then we select the first L pictures as our reference pictures. For B pictures, the reference list is the same as the initialization list. For P pictures, the reference list is reordered according to the POC order, the same way as the initialization list0 for B pictures.

In the CORRELATION algorithm, step 1 is the same as POC algorithm. In step 2, a correlation metric is adopted for reference picture selection and reordering. The L reference pictures which have the highest correlation with the current picture are used.

Hereinafter, an algorithm is provided that uses difference of Histogram. However, it is to be appreciated that the present invention is not limited to solely using the difference of histogram in providing an adaptive Group of Pictures (GOP) structure selection and, thus, other metrics including, but not limited to, absolute difference of pixel, can also be used while maintaining the scope of the present principles.

We first compute the luminance histogram difference of the reference picture to the current picture i as following:

$$YHistoDiff_{ref}(j) = \sum_{i=0}^{nb\_bins-1} \alpha(j)|YHisto_{cur}(i) - YHisto_{ref}(j)|$$

where YHistoDiff is the difference of luminance histogram, nb_bins means the number of bins, and $\alpha(j)$ denotes the weight of the reference picture j, which has a distance $d(j)=|POC(i)-POC(j)|$ to the current picture i by assigning a smaller weight to the reference picture that is closer to the current picture. YHisto denotes histogram of luminance, ref denotes reference picture, and cur denotes current picture.

A linear weight can be adopted as follows:

$$\alpha(j)=(1-(\max\_ref\_distance-d(j)) * 0.1),$$

where max_ref_distance denotes the maximum distance from the reference picture in the reference picture buffer to the current picture d(j) is the distance of reference picture j to current picture l, as defined earlier.

A description will now be given of some of the many attendant advantages/features of the present invention, some of which have been mentioned above. For example, one advantage/feature is an apparatus that includes an encoder for encoding a video sequence using a Group of Pictures structure by performing, for each Group of Pictures for the video sequence, picture coding order selection, picture type selection, and reference picture selection. The selections are based upon a Group of Pictures length.

Another advantage/feature is the apparatus having the encoder as described above, wherein the encoder performs a shot detection to determine a temporal segmentation of the video sequence, decides the Group of Pictures length based on the temporal segmentation, and, within each of the Group of Pictures for the video sequence, performs the picture coding order selection, the picture type selection, and the reference picture selection. Yet another advantage/feature is the apparatus having the encoder as described above, wherein the encoder sets the Group of Pictures length to a pre-defined value based on the temporal segmentation and absent any of a scene cut or a slow transition in the video sequence, restarts a new Group of Pictures for the video sequence from a first picture after the scene cut with the Group of Pictures length when the scene cut is detected, and restarts the new Group of Pictures from a starting point of the slow transition and ending at an ending point of the slow transition when the slow transition is detected.

Moreover, another advantage/feature is the apparatus having the encoder as described above, wherein the video sequence includes a fade-in sequence, and the encoder uses reverse coding for fades and dissolves in the fade-in sequence. Further, another advantage/feature is the apparatus having the encoder that uses reverse coding as described above, wherein the encoder decides a switching point for the reverse coding based on a transition type. Also, another advantage/feature is the apparatus having the encoder that decides the switching point for the reverse coding as described above, wherein the encoder sets the switching point to a minimum of a maximal picture number that can be reversed while satisfying a delay constraint, a decoded picture buffer constraint, and an end picture of the fade-in sequence, when the transition type is pure fade-in. Additionally, another advantage/feature is the apparatus having the encoder that decides the switching point for the reverse coding as described above, wherein the encoder detects the switching point based on absolute differences of pictures, when the transition type is dissolve.

Further, another advantage/feature is the apparatus having the encoder as described above, wherein the encoder selects a picture type from a pre-defined class of picture types, based on a normalized distance. Mover, another advantage/feature is the apparatus having the encoder that selects the picture type from the pre-defined class of picture types as described above, wherein selection criteria for selecting the picture type from the pre-defined class of picture types includes at least one of absolute difference of image, difference of histogram, histogram of difference, block histogram of difference, block variance difference, or motion compensation error.

Also, another advantage/feature is the apparatus having the encoder as described above, wherein the encoder performs the reference picture selection based on at least one of Picture Order Count and correlation.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder configured to encode a video sequence having a fade-in sequence by:
using a group of pictures structure by performing for a group of pictures for a video sequence: picture coding order selection, picture type selection, and reference picture selection, wherein the selections are based upon a group of pictures length;
using reverse coding for fades and dissolves in the fade-in sequence;
determining a switching point for the reverse coding based on a transition type; and
setting the switching point to a minimum of a maximal picture number that can be reversed while satisfying a delay constraint, a decoded picture buffer constraint, and an end picture of the fade-in sequence, when the transition type is pure fade-in.

2. The apparatus of claim 1, wherein said encoder performs a shot detection to determine a temporal segmentation of the video sequence, decides the group of pictures length based on the temporal segmentation, and, within each of the group of pictures for the video sequence, performs the picture coding order selection, the picture type selection, and the reference picture selection.

3. The apparatus of claim 2, wherein said encoder sets the group of pictures length to a pre-defined value based on the temporal segmentation and absent any of a scene cut or a slow transition in the video sequence, restarts a new group of pictures for the video sequence from a first picture after the scene cut with the group of pictures length when the scene cut is detected, and restarts the new group of pictures from a starting point of the slow transition and ending at an ending point of the slow transition when the slow transition is detected.

4. The apparatus of claim 1, wherein said encoder detects the switching point based on absolute differences of pictures, when the transition type is dissolve.

5. The apparatus of claim 1, wherein said encoder selects a picture type from a pre-defined class of picture types, based on a normalized distance.

6. The apparatus of claim 5, wherein selection criteria for selecting the picture type from the pre-defined class of picture types includes at least one of absolute difference of image, difference of histogram, histogram of difference, block histogram of difference, block variance difference, or motion compensation error.

7. The apparatus of claim 1, wherein said encoder performs the reference picture selection based on at least one of a picture order count and a correlation.

8. A video encoding method, comprising:
encoding a video sequence having a fade-in sequence by:
using a group of pictures structure by performing for a group of pictures for a video sequence: picture coding order selection, picture type selection, and reference picture selection, wherein the selections are based upon a group of pictures length
using reverse coding for fades and dissolves in the fade-in sequence
deciding a switching point for the reverse coding based on a transition type; and setting the switching point to a minimum of a maximal picture number that can be reversed while satisfying a delay constraint, a decoded picture buffer constraint, and an end picture of the fade-in sequence, when the transition type is pure fade-in.

9. The method of claim 8, wherein said encoding further comprises:
performing a shot detection to determine a temporal segmentation of the video sequence;
deciding the group of pictures length based on the temporal segmentation; and
performing, within each group of pictures for the video sequence, the picture coding order selection, the picture type selection, and the reference picture selection.

10. The method of claim 9, wherein said encoding further comprises:
setting the group of pictures length to a pre-defined value based on the temporal segmentation and absent any of a scene cut or a slow transition in the video sequence;
restarting a new group of pictures for the video sequence from a first picture after the scene cut with the group of pictures length, when the scene cut is detected; and
restarting the new group of pictures from a starting point of the slow transition and ending at an ending point of the slow transition, when the slow transition is detected.

11. The method of claim 8, wherein said encoding detects the switching point based on absolute differences of pictures, when the transition type is dissolve.

12. The method of claim 8, wherein said encoding selects a picture type from a pre-defined class of picture types, based on a normalized distance.

13. The method of claim 12, wherein selection criteria for selecting the picture type from the pre-defined class of picture types includes at least one of absolute difference of image, difference of histogram, histogram of difference, block histogram of difference, block variance difference, or motion compensation error.

14. The method of claim 9, wherein said encoding performs the reference picture selection based on at least one of a picture order count and a correlation.

* * * * *